J. LANDES.
Seed-Dropper.
No. 16,597.
Patented Feb. 10, 1857.
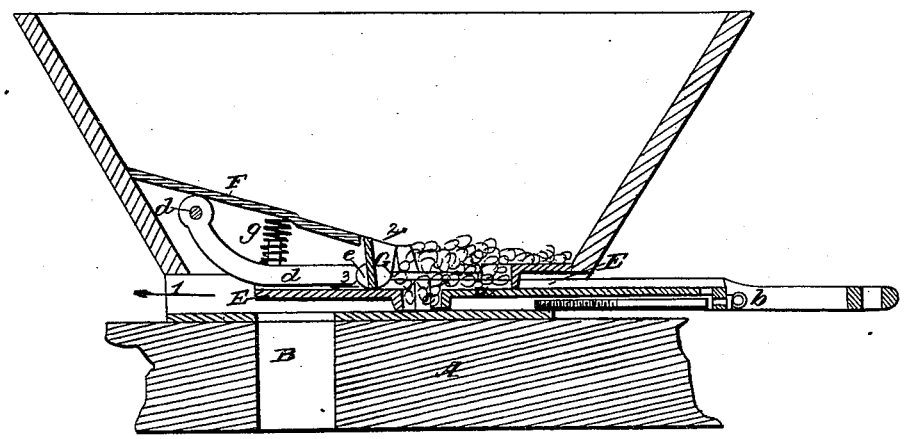
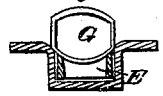
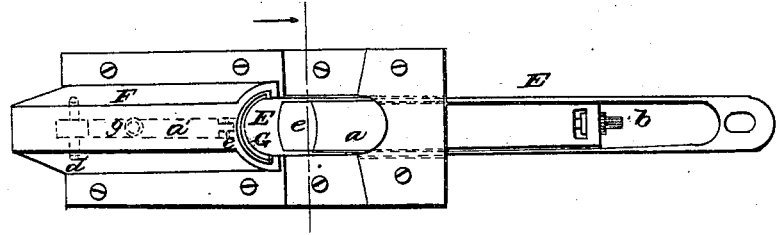

UNITED STATES PATENT OFFICE.

JACOB LANDES, OF SELMA, OHIO.

IMPROVEMENT IN SEED-PLANTERS.

Specification forming part of Letters Patent No. 16,597, dated February 10, 1857.

*To all whom it may concern:*

Be it known that I, JACOB LANDES, of Selma, in the county of Clark and State of Ohio, have invented a new and Improved Machine for Planting Corn and other Seeds; and I do hereby declare that the following is a full, clear, and exact description of the same, reference being had to the annexed drawings, making a part of this specification, in which—

This invention relates to the seed cut-off which rests upon the seed-slide.

The improvement consists in pivoting the front portion of the cut-off in such a manner that while, by its concavity, it collects the seed, and by its vertical movement allows the slide to pass easily, it also has an oscillating motion which causes it to act as a seed-stirrer.

In the annexed drawings, Figure 1 is a side elevation of my improvement in section. Fig. 2 is a top view; Fig. 3 a transverse section.

Similar letters indicate the same parts.

To enable others skilled in the arts to make and use my improvement, I will proceed to describe its construction and operation, reference being had to the annexed drawings, forming a part of this specification, in which—

A is the bar upon which the hopper rests; B, aperture for the escape of seed through A; E, the seed-slide; $c$, aperture or pocket in the slide for the escape of seed; $a$, movable portion of seed-slide E, adjustable by means of set-screw $b$, whereby the aperture $c$ may be made larger or smaller at pleasure; F, cap or shell covering the rear portion of cut-off; G, the cut-off, pivoted at $e$ to the bar $d$. Bar $d$ is pivoted at $d'$ to the cap or covering-shell F.

$g$ is a spiral spring, which acts between shell F and bar $d$, and serves to press bar $d$ down, though permitting it to rise when required, as will hereinafter appear.

By reference to Fig. 4 it will be seen that the upper surface of slide E is concave, and that the lower portion of cut-off G is convex and fits into the concave surface of slide E.

By reference to Fig. 5 it will be seen that in its horizontal direction cut-off G is concave, so that it will collect the seed.

The operation is as follows: The seed, having been placed in the hopper, falls into the pocket $c$, and the slide E, operated by suitable mechanism, moves toward the concave or front end of cut-off G in direction of arrow 1. If any of the seeds contained in the pocket $c$ should project above the line of the surface of slide E, the said seeds will come in contact with the bottom part of cut-off G and cause it to oscillate slightly on its pivot $e$, the upper part of the cut-off G being thrown forward in direction of arrow 2, against the mass of seed, thus stirring it, while the lower part is thrown back in direction of arrow 3, and presents an inclined surface to the projecting seeds before mentioned.

In consequence of the pivoting of bar $d$ it will rise, and with it the cut-off G, when the seeds press against the lower part of the cut-off G, and thus the seeds will pass easily under the cut-off without being broken, and when the slide E has advanced to the end of its stroke, in direction of arrow 1, the pocket $c$, with its contents, will have been brought over the aperture B, through which the seeds will fall into the ground.

The slight shock or stir which the oscillations of the cut-off impart to the seed will be sufficient to keep the seed always loose, prevent all tendency to clogging, &c.

By this arrangement of parts I also dispense with seed-brushes or soft elastic substances, being enabled to use a metallic cut-off, which is more durable.

I disclaim the making of a seed cut-off with a concave face. I also disclaim the giving of a vertical movement to a cut-off, as both of these features are old.

What I claim as my improvement, and desire to secure by Letters Patent, is—

Pivoting the cut-off G to the bar $d$, so that the cut-off shall have an oscillating movement, and thus stir the seed when it oscillates, in the manner and for the purposes herein set forth.

JACOB LANDES.

Witnesses:
HARRIET E. ELDER,
ROBT. ELDER.